(12) United States Patent
Karr

(10) Patent No.: US 11,757,487 B2
(45) Date of Patent: Sep. 12, 2023

(54) SYSTEMS AND METHODS FOR LONG RANGE, HIGH-CAPACITY MULTIPOINT DISTANCE AND VELOCITY MEASUREMENT

(71) Applicant: Lawrence J. Karr, Santa Monica, CA (US)

(72) Inventor: Lawrence J. Karr, Santa Monica, CA (US)

(*) Notice: Subject to any disclaimer, the term of this patent is extended or adjusted under 35 U.S.C. 154(b) by 0 days.

(21) Appl. No.: 17/578,162

(22) Filed: Jan. 18, 2022

(65) Prior Publication Data

US 2022/0255581 A1 Aug. 11, 2022

Related U.S. Application Data

(60) Provisional application No. 63/147,546, filed on Feb. 9, 2021.

(51) Int. Cl.
*H04B 1/7075* (2011.01)
*H04B 1/7077* (2011.01)

(52) U.S. Cl.
CPC ....... *H04B 1/70752* (2013.01); *H04B 1/7077* (2013.01)

(58) Field of Classification Search
CPC .............. H04B 1/70752; H04B 1/7077; H04B 1/7073; G01S 13/825
See application file for complete search history.

(56) References Cited

U.S. PATENT DOCUMENTS

| | | | | |
|---|---|---|---|---|
| 5,912,644 | A * | 6/1999 | Wang ..................... | G01S 5/14 375/130 |
| 5,945,948 | A * | 8/1999 | Buford ................... | G01S 5/021 342/457 |
| 8,188,908 | B2 * | 5/2012 | Landt ...................... | G01S 3/02 342/51 |
| 2010/0311424 | A1 * | 12/2010 | Oga ...................... | H04W 36/32 455/440 |
| 2017/0332340 | A1 * | 11/2017 | Noh ....................... | G01S 5/0289 |
| 2017/0374572 | A1 * | 12/2017 | Kleinbeck ............. | H04W 24/10 |
| 2018/0356531 | A1 * | 12/2018 | Naveen ................. | G01S 19/30 |
| 2021/0359812 | A1 * | 11/2021 | Bai ........................ | H04L 5/0007 |
| 2022/0131630 | A1 * | 4/2022 | Ghozlan ............... | H04W 24/08 |

* cited by examiner

*Primary Examiner* — Dac V Ha

(57) ABSTRACT

A round-trip, spread-spectrum navigation and locating system achieves high capacity and large processing gains in one-to-many and many-to-one configurations using round-trip signaling with frequency division based upon precise responding device carrier frequency offsets. Reduced cross-correlation is achieved by assigning these very small disparate frequency offsets to replies from interrogated devices so that the long-term correlation between disparate reply sequences is reduced almost to that of random noise of equivalent energy. The invention supports simultaneous interrogation of multiple responding devices, which responding devices respond essentially simultaneously at a fixed delay after receiving the query. The originating and/or responding devices may be fixed or mobile, permanently or temporarily deployed, terrestrial, airbourne or space-based with any source of power including batteries and solar without limitation. The signaling may be electromagnetic or acoustic with the potential for under-water use.

19 Claims, 6 Drawing Sheets

SYSTEMS AND METHODS FOR LONG RANGE, HIGH-CAPACITY MULTIPOINT DISTANCE AND VELOCITY MEASUREMENT

REFERENCE TO RELATED APPLICATIONS

This application claims priority to and the benefit of U.S. Provisional Patent Application Ser. No. 63/147,546, filed Feb. 9, 2021, the entire content of which is incorporated herein by reference.

FIELD OF THE INVENTION

This invention relates generally to location and navigation and, in particular, to systems and methods for location and navigation using distance and Doppler measurements from electromagnetic or acoustic signals.

BACKGROUND OF THE INVENTION

There is a large body of technology for performing navigation using radio beacons and for locating tagged objects. The GPS, GLONASS, BEI-DOU, and GALILEO satellite navigation systems are well known examples. These systems commonly use Time-Difference-of-Arrival (TDOA) and Doppler measurement to determine receiver positions where the emitters are in orbit about the earth. There are also existing systems for locating radio signal emitting objects by means of signal strength, signal direction of arrival, signal time of arrival and by Doppler shift.

A powerful method for time-of-flight determination uses pseudo-noise sequences, generally known as direct sequence spread spectrum (DSSS). This method is employed in satellite navigation systems, and is used in lieu of the direct transmission of single very powerful, very short pulses. DSSS systems provide "despreading gain" which is generally proportional to the length of the sequence. These satellite navigation systems are one-way systems, that is, the distance to a particular satellite in not instantly knowable from its time of reception. This is resolved by using "time-difference-of-arrival" methods in all popular satellite navigation systems.

It is possible to construct location systems as well as navigation systems using round-trip time-of-arrival signaling. Round-trip signaling offers greatly improved performance compared to one-way TDOA signaling. It is desirable for various purposes to use two-way ranging which drastically reduces geometric dilution of precision, and makes Doppler measurements much more accurate, since, for crystal oscillators, the ADEV or short-term instability of a given oscillator is much smaller than its absolute frequency error. A two-way Doppler system cancels out absolute frequency errors, but one-way systems do not. Navigation satellites generally use atomic frequency references, which produce extremely accurate frequencies.

When attempting to achieve high sensitivity in location or ranging systems, additional integration and/or incoherent averaging is used to raise signals above the ambient noise. Early vintage GPS receivers generally acquired one Gold code frame at a time with an indicated despreading gain of ~30 db, and had noise bandwidths of approximately 1 KHz (1/Gold code sequence time), which limited operation to outdoor sites with a clear view of the sky. Such GPS receivers typically had 1 KHz noise bandwidth, a 2 db noise figure, and a 9 db required S/N for detection. Under these conditions, the minimum detectable signal would be −174 dbm+30 dbHz+2 db+9 db=−133 dbm from the antenna.

GPS C/A signals are designed to have an earth's surface half omni-directional antenna captured power level of −130 dbm, so early GPS receivers had very little margin for fading or indoor operation. Since the C/A code is a CDMA-DSSS system with a pattern length of 1023 chips, but a data rate of only 50 Hz, the next step up in performance is to correlate using 20 patterns coherently integrated. This is easily done by various means, and adds 10 db to cold start sensitivity, improving it to about −143 dbm. An additional 3 db can be achieved by integration of all 20 sequences in a data bit, at the expense of processing complexity. This improves cold start performance to approximately −146 dbm, a performance today achieved by inexpensive GNSS chips.

This multi-pattern signal processing serves well to extract signals from random noise, but does not necessarily deal well with the CDMA "near-far" problem in which stronger signals from nearby sources overwhelm the orthogonality of the code set. Under some circumstances, it can be extremely difficult to decode signals of adequate strength when spurious cross correlation terms approach the level of the desired correlation result.

SUMMARY OF THE INVENTION

This invention resides in a round-trip, spread-spectrum navigation and locating system and method that achieves high capacity and large processing gains. The system may be arranged in one-to-many or many-to-one configurations using round-trip signaling with frequency division based upon precise responding device carrier frequency offsets.

An originating device includes a wireless signal transmitter, a wireless receiver and a signal processor operative to coordinate send/receive operations. A plurality of responding devices each includes a wireless signal transmitter and receiver and operative electronics. CDMA-DSSS (Code Division Multiple Access-Direct Sequence Spread Spectrum) signaling is used between the originating device and the responding devices. The originating device is operative to send and capture signals from the responding devices to determine spatial or velocity relationships between the originating device and the responding devices. The spatial or velocity relationships between the originating device and the responding devices may include the relative location or velocity of the originating device and a selected responding device.

In accordance with the invention, the signals from the responding devices are assigned disparate reply frequency offsets, such that when the originating device coherently accumulates and correlates a sequence with a spreading code for a selected device, the codes processed from non-selected devices are nearly orthogonal to the selected device spreading code due to the disparate reply frequency offsets, thereby substantially reducing cross-correlation.

The signaling between the originating device and the responding devices may be electromagnetic or acoustic. The signaling may be half-duplex or full duplex. The responding devices may be tagged objects at unknown locations, anchors at known locations, or a combination thereof.

The simultaneous, round-trip distance and round-trip Doppler measurements obtained from a plurality of responding devices at known locations may be used to precisely establish the locution and velocity of the interrogating device. The simultaneous signaling may be used to speed the of multiple responding devices of tagged object, which may simply be referred to as tags.

A method of distance measurement according to the invention may comprise the steps of:

(a) transmitting a wireless signal from an originating device to a plurality of responding devices using CDMA-DSSS (Code Division Multiple Access-Direct Sequence Spread Spectrum) signaling;

(b) receiving signals from the responding devices during an integration interval, with the signal from each responding device being assigned a different reply frequency offset;

(c) providing a signal processor at the originating device, and coherently processing a sequence received from a selected responding device, and wherein the sequences received from the other responding devices are nearly orthogonal to the selected device sequence due to the frequency offsets; and (d) determining a spatial or velocity relationship between the originating device and the selected responding device.

The method may include the steps of (e) selecting a different responding device and repeating steps (c)-(d) with respect to the different responding device; and (f) repeating steps (c)-(e) with respect to any other responding device or devices to determine spatial or velocity relationships between the originating device and the responding devices.

The originating device may determine spatial or velocity relationships between the originating device(s) and responding device(s) using multilateration.

DETAILED DESCRIPTION OF THE INVENTION

This invention addresses certain difficulties experienced with multiple simultaneous signals occupying the same spectrum. In CDMA DSSS systems, there is a "near-far" problem, wherein a nearby source with a particular sequence may degrade simultaneous reception of signals from a more distant weaker source even though those signals are designed to be nearly orthogonal to each other. This nearly orthogonal property is evident in the GPS systems C/A codes where the cross correlation between codes routinely degrades system performance when one strong signal comes from a satellite near the zenith and a much weaker signal comes from a satellite near the horizon. Iterative joint estimation methods may be used to minimize these effects.

To address such challenges, the present invention implements a simultaneous, multipoint two-way ranging and Doppler system in which very large de-spreading gain is achieved, and in which this gain is essentially unaffected by cross correlation between simultaneously received sequences of disparate spreading codes. Normally, interrogated round-trip Doppler devices emit reply signals based on their measurement of the incoming signal's frequency. In half-duplex (single-channel time sharing) signaling situations, these replies are conveniently at the incoming signal frequency. In full-duplex (transmit and receive over different channels) Doppler systems, the signals emitted by responding devices will depend on the signal frequency received from the interrogating device, and will usually be a multiple or submultiple of the measured frequency to facilitate non-interference between receivers and transmitters.

This reduced cross-correlation is achieved by assigning very small disparate frequency offsets to replies from interrogated devices so that the long-term correlation between disparate reply sequences is reduced almost to that of random noise of equivalent energy.

Figure 4A:
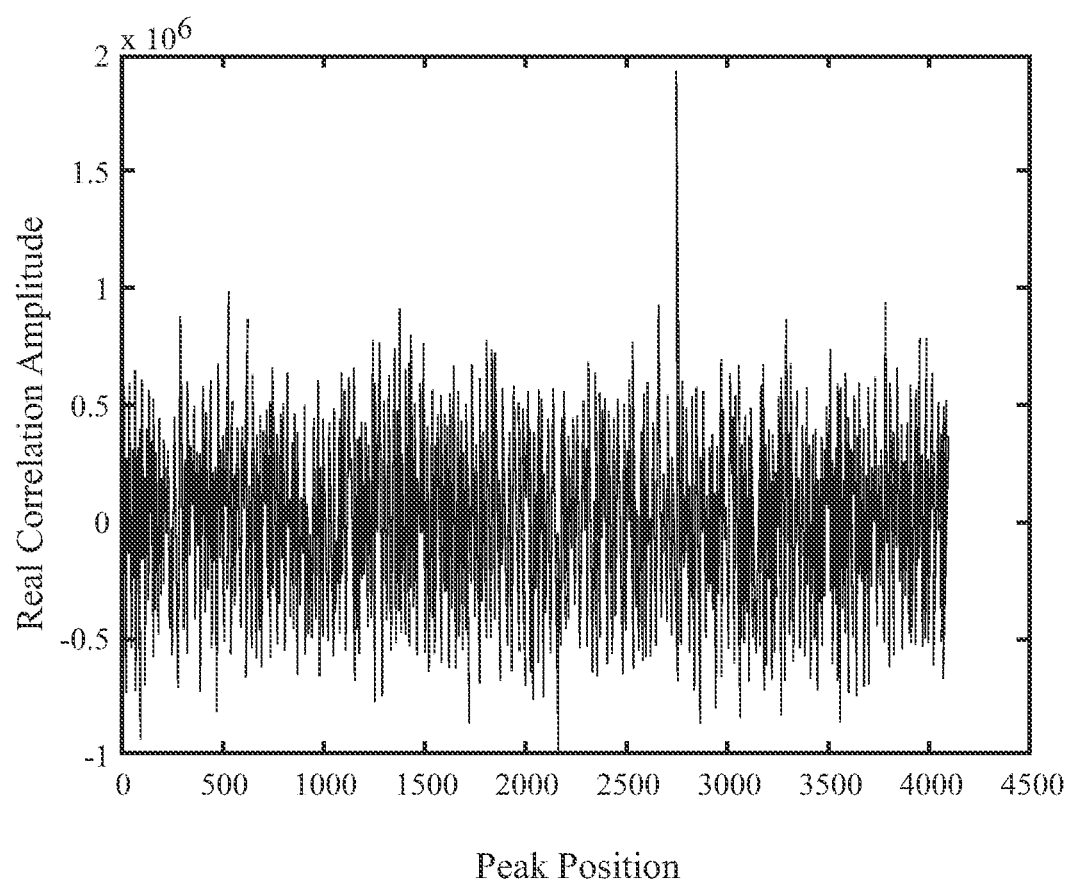
FIG. 4A is a chart illustrates correlation at an originating device with +20 db interferer at −37 db signal-to-noise ratio with no reply frequency offset.
Figure 4B:
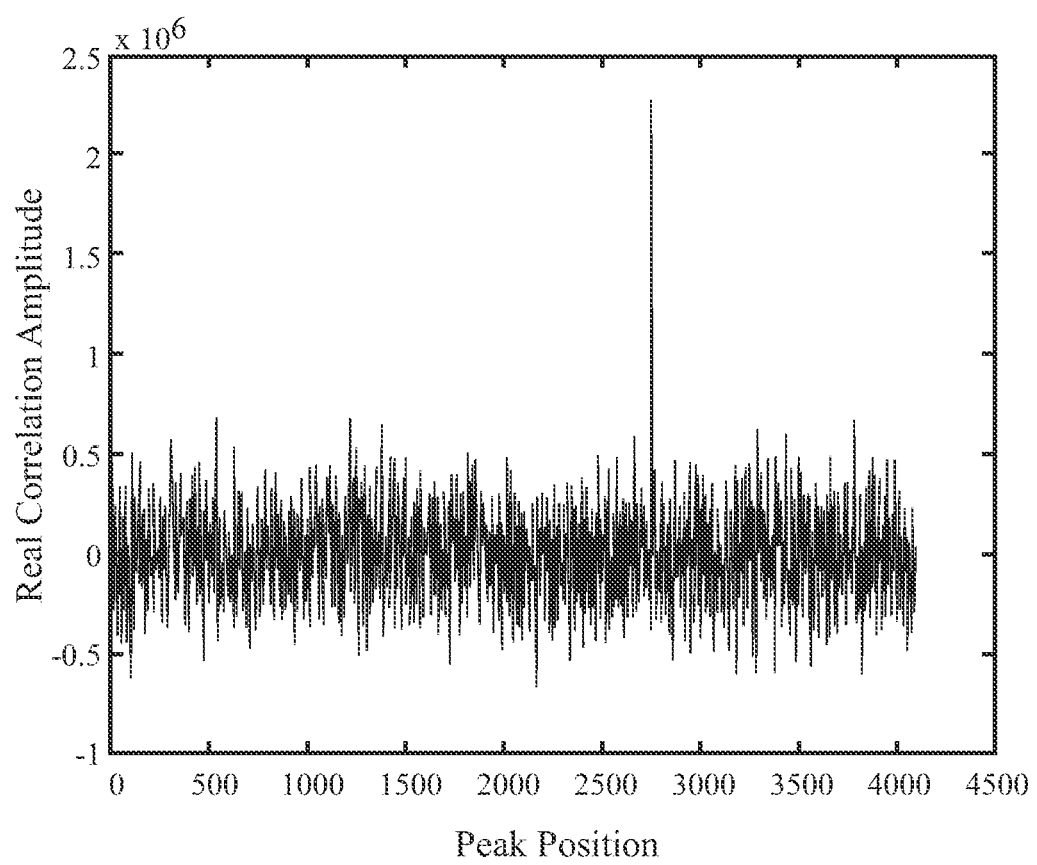
FIG. 4B shows correlation at an originating device with +20 db interferer at −37 db signal-to-noise ratio but with a reply frequency offset of 2.5 KHz.
Figure 4C:
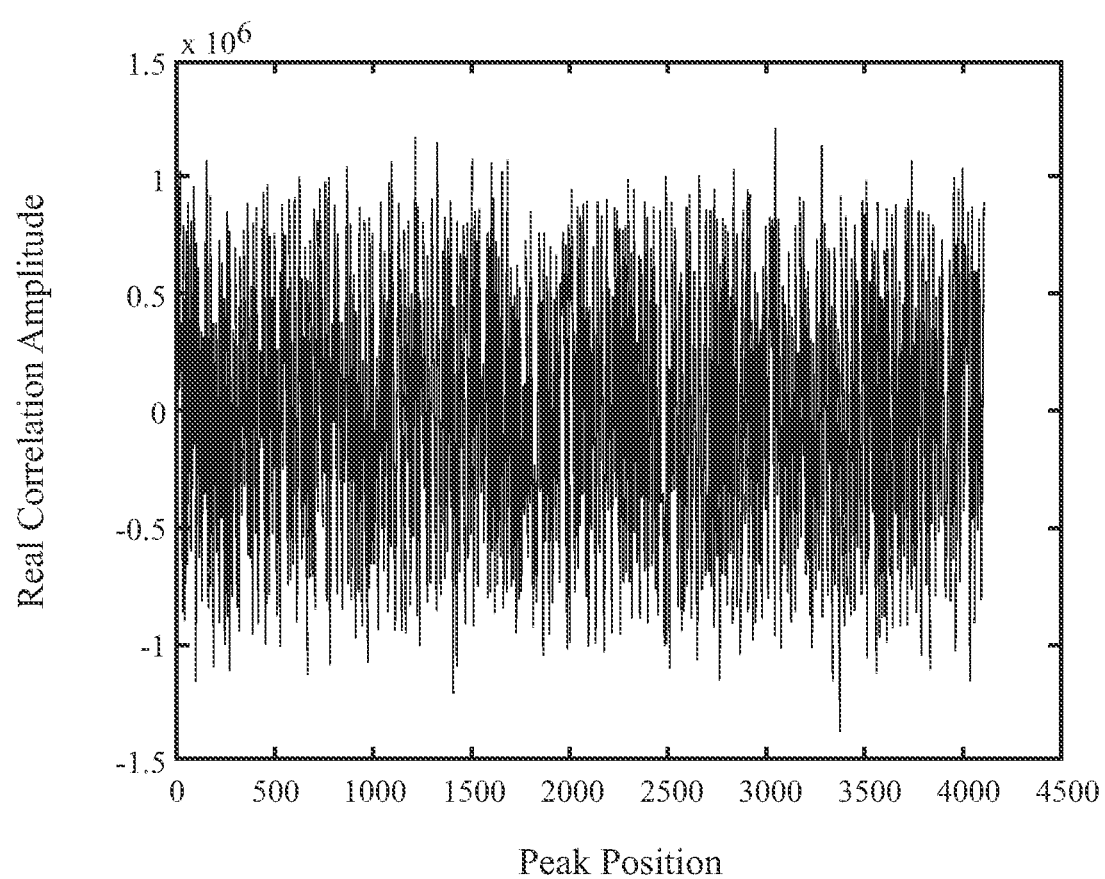
FIG. 4C shows correlation at an originating device with +26 db interferer at −37 db signal-to-noise ratio with no reply frequency offset.
Figure 4D:
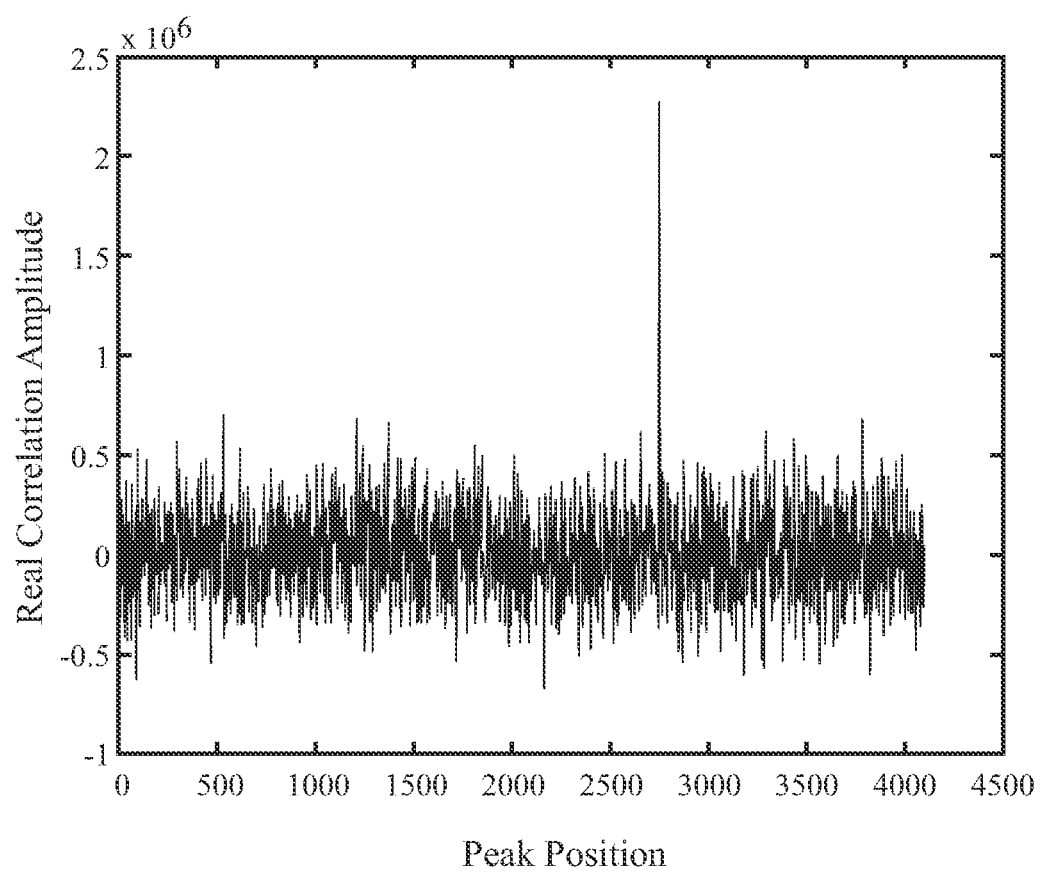
FIG. 4D illustrates correlation at an originating device with +26 db interferer at −37 db signal-to-noise ratio with a 900 Hz frequency offset.

FIGS. 4A-D illustrate the effectiveness of the system and method. FIG. 4A is a chart illustrates correlation at an originating device with +20 db interferer at −37 db signal-to-noise ratio with no reply frequency offset. FIG. 4B shows the correlation of FIG. 4A with a reply frequency offset of 2.5 KHz. Similarly, FIG. 4C shows correlation at an originating device with +26 db interferer at −37 db signal-to-noise ratio with no reply frequency offset, and FIG. 4D shows the correlation with a 900 Hz frequency offset.

The invention supports simultaneous interrogation of multiple responding devices, which responding devices respond essentially simultaneously at a fixed delay after receiving the query. This would normally cause "near far" reception for a system in which responding device replies consist of sequences of family similar spreading codes. If responding devices reply at very nearly the same frequency and at the same time, then the cyclic integration used as in GPS will fail to enhance the correlated desired signal more than other signals using similar signaling and frequencies.

One embodiment uses "anchors" which are responding devices with precisely surveyed positions known to the originating device or "locator." In the proposed system an interrogating device (i.e., the locator) would transmit a common interrogating signal to all anchors in a group, and then each anchor would respond with its unique identifying set of spreading codes. In this way, all distances and relative velocities are measured at once, as the locator emits, and then captures signals once per epoch. The locator determines its position and vector velocity by means of multilateration. This very quick signaling method makes it necessary that the interrogating device separate the spreading codes which are more or less simultaneous. This causes the system to be potentially vulnerable to the near-far problem, given that some anchors will be closer than others.

In an example system, length 2047 quaternary sequences are used to provide a basic despreading gain of 33 db, and much larger despreading gains for coherently received and integrated collections of code sequences, typically arrays of 100 concatenated spreading sequences. That example system provides despreading gain of log 10(100*2047) or 53 db. If, however, other sequences of the same amplitude, length, chip rate and received carrier frequency are simultaneously received, then the additional despreading gain will be limited by the 33 db cross correlation between sequences, limiting the effective recovered S/N and in turn limiting accuracy.

This is made worse in cases where one anchor is much closer than another (Near-Far effect). In this case, with, say a 10:1 distance ratio, the recovered signal to noise ratio of the signal from the more distant anchor might be only 13 db above effective noise when despread, considerably degrading accuracy.

The achievable time measurement accuracy is given by the Cramer-Rao bound, in which the product of the signal to noise ratio and the integration inversely affects timing uncertainty. The chip rate, of course, also inversely affects timing uncertainty. For the system mentioned, an equal power anchor operating on the same frequency and at $1/10^{th}$ the distance will limit despread signal to noise ratio to about 13 db, since the integration of 100 sequences strengthens the nearby anchor's signal as much as it does the distant anchor's signal.

As an example of the loss of accuracy from near-far interference, consider a co-channel signaling case where one anchor is $1/10^{th}$ the distance from the locator as another anchor, and the locator is processing the weaker signal. We assume that, absent the co-channel interference, the more distant anchors signal was received 20 decibels under wideband noise. Since the processing gain of the system is 53 db, then the output S/N would be +33 db, which at a 13 MHz chip rate gives a time uncertainty of 340 picoseconds RMS, for a distance noise of about 10 cm RMS. With the coherent interfering signal at the same frequency and 20 db above the desired signal, the output S/N is only +13 db, which gives a degraded distance noise of 1 meter RMS.

The preferred embodiment corrects for this by assigning precise transmit frequency offsets to each anchor, so that, when coherently accumulating and correlating a sequence of the selected spreading code, the other accumulated sequences for non-selected spreading codes show greatly reduced correlation. These disparate frequency offsets, are used so that, over the period of accumulation or integration, the sequences for undesired codes are nearly orthogonal to sequences for the desired code over the integration interval. More precisely, when coherently accumulating a number of spreading code patterns, the accumulated signal is subject to sin x/x or sinc function amplitude reduction. If the integration period is, say 16 milliseconds, and if the received frequencies differ by several hundred Hz, then the accumulated undesired signal will not coherently sum in the receiver.

The frequency separations need to be large enough to be unambiguous despite Doppler from platform motion (e.g., motion of the locator). For instance, if the platform moves at 100 meters/second, then the round-trip Doppler could be as great as 2*100 m/sec/C, which is 200/3e8 or 660 ppb. At say, 915 MHz, this is a frequency difference of ~550 Hz. To avoid ambiguity, frequency offsets need to be at least twice this amount, or about 1100 Hz. This offset would apply if said platform were moving directly toward one anchor and directly away from another. Thus, a separation of 1600 Hz would ensure orthogonality despite Doppler at speeds to 100 meters/second. A practical implementation would use a frequency division scheme where each anchor's signals are assigned to a particular frequency offset.

A less optimal method of achieving orthogonality would iteratively re-synthesize un-shifted signals from their correlation peaks in order of signal strength, and then cancel them out until the weakest signal was processed. This method does not work as well, since two signals may be of equivalent strength and have similar Doppler values. This method is also more computationally intensive.

With 16 msec integration of about 100 code sequences, the theoretical despreading gain of 53 db in this case is generally achieved, which provides for extremely precise, unbiased timing estimation. Without either method, the interrogating device should experience despread signal to noise ratios, when 10 times closer to the unselected responding device, as small as 13 db. With the less optimal iterative cancellation method, signal to noise may be improved to perhaps 25 db de-spread. Finally, the preferred embodiment will generally maintain despread worst case S/N's greater than 31 db so long as the signal to noise ratio is better than −20 db. The preferred embodiment will typically achieve despread S/N's approaching 53 db.

Figure 1:
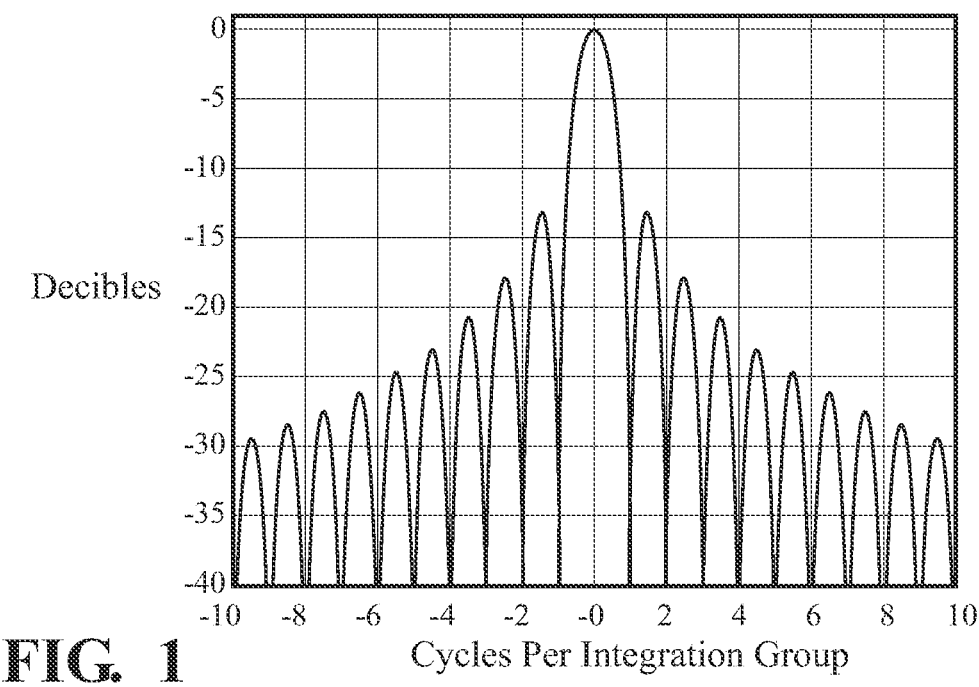
FIG. 1 illustrates the abs(sin(x)/x) function which governs cross-code interference amplitude.

The abs(sin(x)/x) function shown in FIG. 1 governs the cross-code interference amplitude. Note that the pre-programmed frequency offsets are generally very small with respect to carrier frequencies of hundreds of Megahertz to more than a Gigahertz and to signal bandwidths of several Megahertz to several hundred Megahertz. For carrier frequencies around 1 GHz and integration periods of the order of 10 milliseconds, the indicated reply frequency differences are the order of hundreds of Hz, or generally less than 1 ppm. The correlating receiver, with advance knowledge of these offsets, will search across a range of Doppler offsets centered at the corresponding responding device's frequency offset. These small frequency offsets make it possible to have dozens of simultaneous responding transmissions without material degradation to despread signal to noise ratios, since unselected signals will appear as incoherent noise.

Figure 2A:
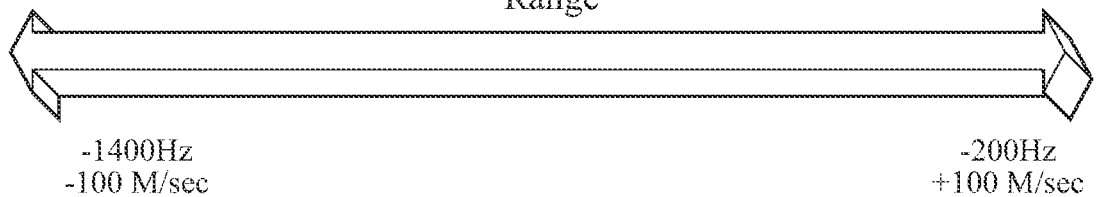
FIG. 2A shows a first responding device programmed for a −800 Hz offset.
Figure 2B:
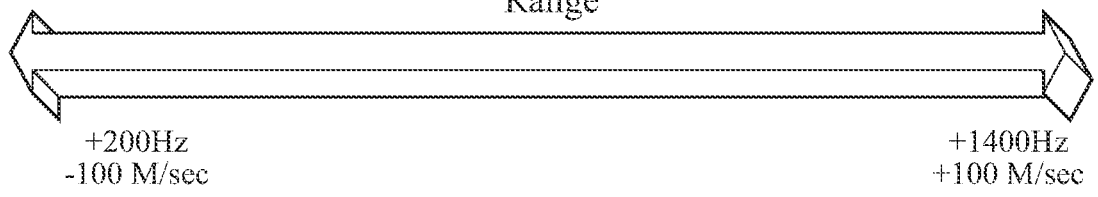
FIG. 2B shows a second responding device programmed for a +800 Hz offset.

With reference to FIG. 2, below, if a first responding device or "tag" numbered 1 (i.e., Tag 1) is programmed for −800 Hz offset, and a second responding device or "tag" numbered 2 (i.e. Tag 2) is programmed for +800 Hz offset, signal from an aircraft approaching tag 1 at 100 meters/second would be received, considering Doppler shift, by Tag 1 at 275 Hz above nominal carrier frequency. Tag 1 emissions would, without this scheme, be received by the locator at +550 Hz. With this scheme, Tag 1 would transmit at a frequency of −525 Hz with respect to the locator transmit frequency, and the signal from Tag 1 would be received by the locator at −250 Hz below nominal carrier frequency.

If that aircraft were departing from Tag 2 at 100 meters/second, then Tag 2 would receive at −275 Hz with respect to nominal locator carrier, and would, without frequency offset, transmit at −275 Hz. Given it's programmed frequency offset, it would transmit at +525 Hz. The signal transmitted by Tag 2 would be received by the locator at +250 Hz with respect to the locator carrier frequency.

The search for replies from Tag 1 will span the frequency offset range centered about −800 Hz, ranging from −200 Hz to −1400 Hz. The search for replies from Tag 2 will span the frequency range centered about +800 Hz, from +200 Hz to +1400 Hz. With the proposed integration and correlation scheme, the correlation of signals from Tag 1, when appropriately frequency shifted, will not be interfered with signals from Tag 2, since the successive captured packets of the interfering signal will not add coherently.

The processing used to perform this would include:
1. Capture entire expected signal sequence;
2. Perform various frequency shifts "spins" of the signal sequences prior to summing packets for correlation processing;
3. Compute the forward FFT of the trial spun set of 100 packets summed chipwise;
4. Multiply the forward FFT of the trial spun set above with the complex conjugate of an FFT of a reference code; and 5. Compute the inverse FFT to obtain the correlation of the re-spun summed 100 packet set with the reference pattern.
6. Subtracting the known frequency offset of the particular tag from its locators received frequency to produce an unbiased Doppler estimate.

An alternative procedure producing equal results would perform FFT-based correlation on the 100 packets, and then produce frequency shifted sums of those correlation patterns. Note that packets in our example have a duration of about 160 microseconds, and can be correlated despite frequency shifts up to a few KHz.

A less computationally efficient alternative to this process would be to use spreading codes of approximately length 100*2047, received and sampled as complex sequences of 204700 samples, and performing transform-based correlation on the sequences rotated in at best 100 Hz steps. This process, with standard processing, requires 100*(18/12) =150 times the effort to achieve similar results. This alternative will consume more power in any case, and may increase the size and/or decrease the usable processing speed compared to the proposed method.

Figure 3:
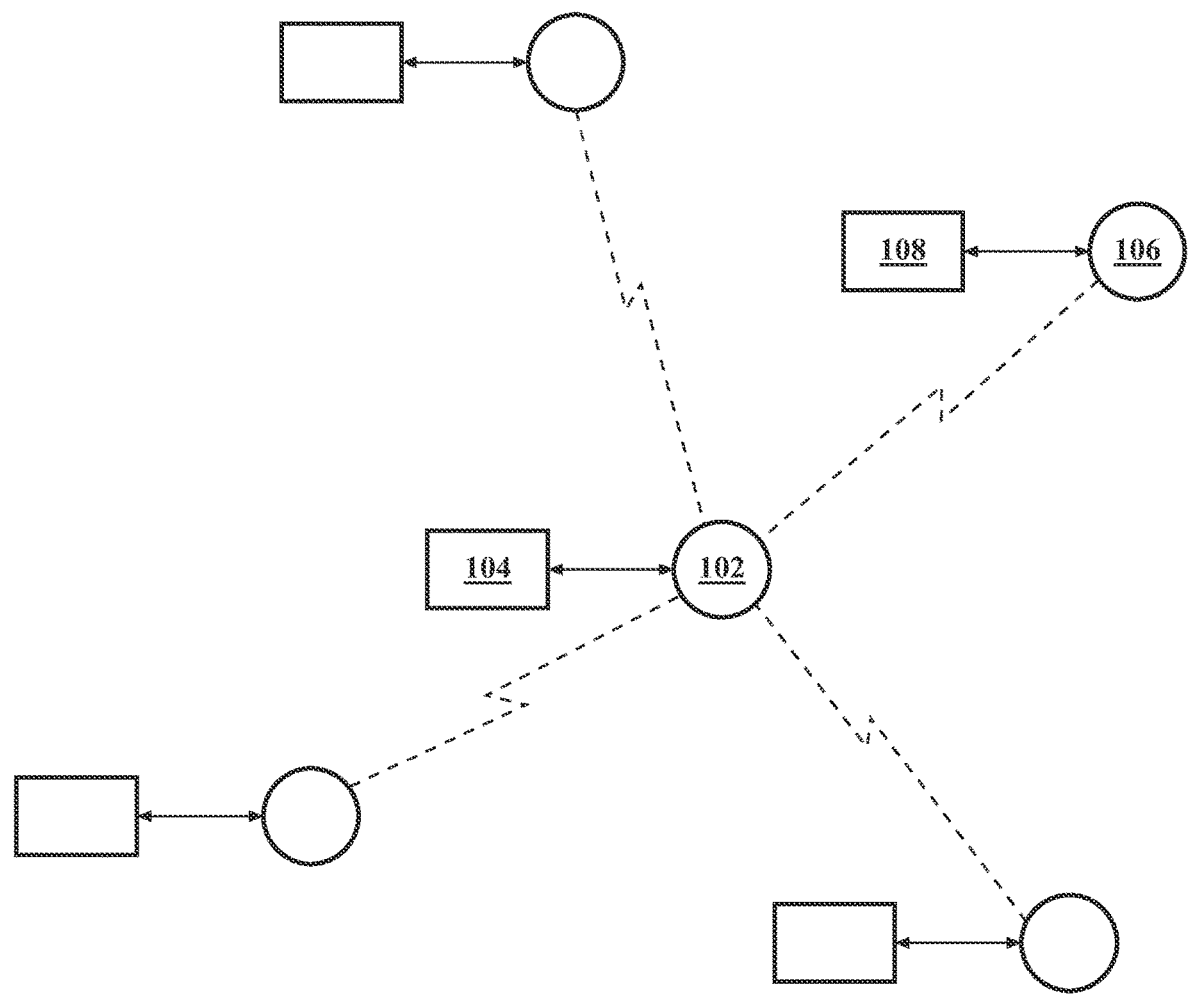
FIG. 3 is a simplified diagram showing a signal originating device and a plurality of responding devices.

FIG. 3 is a simplified diagram showing a signal origination device 102 including a processor 104 operative to perform coherent signal processing. The originating device is in communication with a plurality of responding devices (i.e., 106), also including processors (i.e., 108) to coordinate receive/send operations and perform any required numerical transformations. Processors 104, 108 may be of conventional or proprietary design, and would include memories for storage of application programming, variables, offsets, and the like, as well us interface circuitry for human interface controls, the display of distance or other measurements. The design and construction of the hardware and software would be apparent to one skilled in the art of coherent signal processing given the teachings of this specification. It is further understood that the various signal senders and receivers may be stationary or moving, and may be used for geolocation of persons, vehicles and other objects without limitation.

The invention claimed is:

1. An enhanced, high-sensitivity round-trip distance measuring system, comprising:
   an originating device including a wireless signal transmitter, a wireless receiver and a signal processor;
   a plurality of responding devices, each including a wireless signal transmitter and receiver, each being assigned disparate reply frequency offsets, and each being assigned disparate spreading codes;
   wherein CDMA-DSSS (Code Division Multiple Access-Direct Sequence Spread Spectrum) signaling is used between the originating device and the responding devices;
   wherein the originating device is operative to send and capture signals from the responding devices to determine spatial or velocity relationships between the originating device and the plurality of responding devices; and
   wherein the originating device coherently accumulates and correlates a sequence using the spreading code of code of a selected responding device such that sequences using spreading codes for non-selected devices are nearly orthogonal to the sequence of the selected device due to the disparate reply frequency offsets, thereby substantially reducing cross-correlation.

2. The system of claim 1, wherein the spatial or velocity relationships between the originating device and the responding devices include the relative location or velocity of the originating device and the selected responding device.

3. The system of claim 1, wherein the signaling between the originating device and the responding devices is electromagnetic.

4. The system of claim 1, wherein the signaling between the originating device and the responding devices is acoustic.

5. The system of claim 1, wherein the signaling is half duplex.

6. The system of claim 1, wherein the signaling is full duplex.

7. The system of claim 1, wherein the responding devices are tags at unknown locations.

8. The system of claim 1, wherein the responding devices are anchors at known locations.

9. The system of claim 1, wherein the plurality of responding devices have known locations, and wherein the simultaneous round-trip distance and round-trip Doppler measurements obtained from the plurality of responding devices with known locations are used to precisely establish the location and velocity of the originating device.

10. The system of claim 1, wherein simultaneous signaling is used to speed the tracking of multiple responding devices.

11. A method of distance measurement, comprising the steps of:
   (a) transmitting a wireless signal from an originating device to a plurality of responding devices using CDMA-DSSS (Code Division Multiple Access-Direct Sequence Spread Spectrum) signaling;
   (b) receiving signals from the responding devices during an integration interval, with the signal from each responding device being assigned a different reply frequency offset and each being assigned different spreading codes;
   (c) providing a signal processor at the originating device, and coherently processing a sequence received from a selected responding device, wherein the sequences received from the other responding devices are nearly orthogonal to the sequence received from the selected device due to the differences in the reply frequency offsets; and
   (d) determining a spatial or velocity relationship between the originating device and the selected responding device.

12. The method of claim 11, including the step of (e) selecting a different responding device and repeating steps (c)-(d) with respect to the different responding device.

13. The method of claim 12, including the step of (f) repeating steps (c)-(e) with respect to any other responding device or devices to determine spatial or velocity relationships between the originating device and the responding devices.

14. The method of claim 11, wherein the spatial or velocity relationships between the originating device and the responding devices include the relative location or velocity of the originating device and a selected one of the responding devices.

15. The method of claim 11, wherein the signaling between the originating device and the responding devices is electromagnetic.

16. The method of claim 11, wherein the signaling between the originating device and the responding devices is acoustic.

17. The method of claim 11, wherein the originating device determines spatial or velocity relationships using multilateration.

18. An enhanced, high-sensitivity round-trip distance measuring system, comprising:
- an originating device including a wireless signal transmitter, a wireless receiver and a signal processor;
- a plurality of responding devices, each including a wireless signal transmitter and receiver;
- wherein CDMA-DSSS (Code Division Multiple Access-Direct Sequence Spread Spectrum) signaling is used between the originating device and the responding devices;
- wherein each of the plurality of responding devices is assigned a corresponding reply frequency offset and spreading code;
- wherein the corresponding reply frequency offset and spreading code for each of the plurality of responding devices is different from one another; and
- wherein the originating device is operative to:
  - send and capture signals from the plurality of responding devices to determine spatial or velocity relationships between the originating device and the plurality of responding devices; and
  - coherently accumulate and correlate sequences for each selected responding device by applying the corresponding frequency offset and spreading code, wherein the sequences for non-selected responding devices are nearly orthogonal to the sequence of the selected device due to the different reply frequency offsets, thereby substantially reducing cross-correlation.

19. The device of claim 18, wherein the signal processor and receiver of the originating device are configured to coherently accumulate and correlate sequences for each selected responding device by:
- capturing the signal sequence using the corresponding spreading code of the selected responding device,
- frequency shifting the captured signal sequence using the reply frequency offset, prior to summing chipwise;
- computing the forward FFT of the frequency shifted sequence, summed chipwise;
- multiplying the forward FFT of the frequency shifted sequence, summed chipwise, with a complex conjugate of an FFT with a reference code to provide a product; and
- computing the inverse FFT of the product to obtain the correlation function of the reference spreading code with the frequency shifted captured signal.

* * * * *